April 14, 1942.    E. G. RAGATZ    2,280,030
APPARATUS FOR DETECTING WATER AND OTHER VOLATILES
Original Filed June 26, 1937
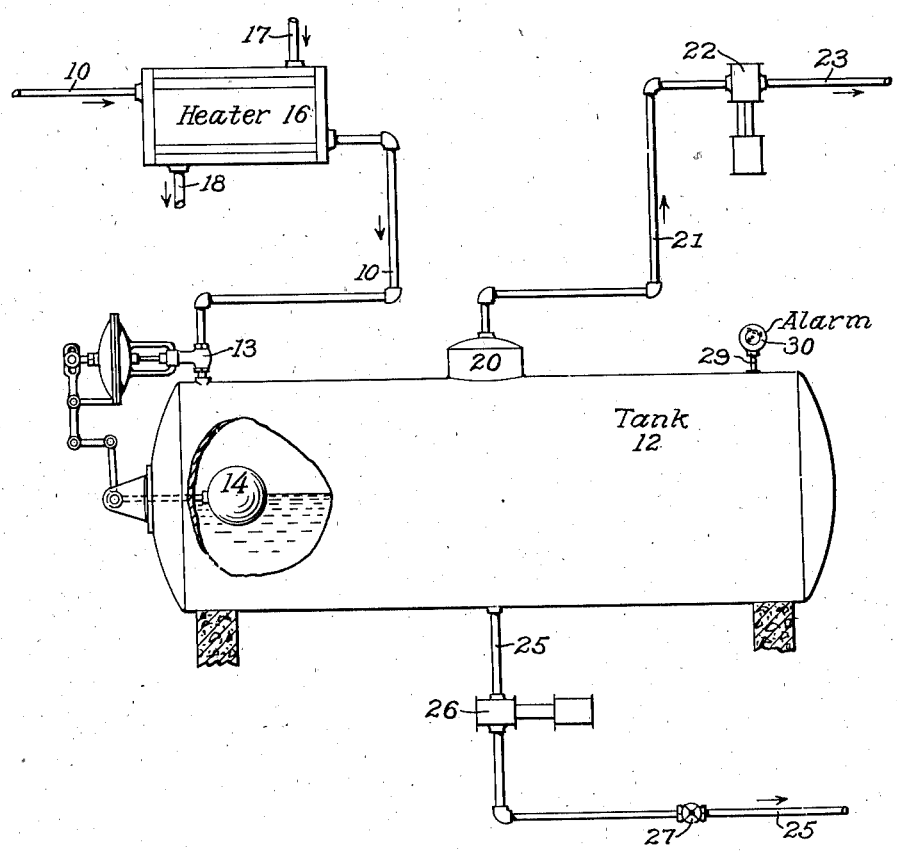
INVENTOR.
Edward G. Ragatz
BY Philip Subkow
ATTORNEY.

Patented Apr. 14, 1942

2,280,030

UNITED STATES PATENT OFFICE 2,280,030

APPARATUS FOR DETECTING WATER AND OTHER VOLATILES

Edward G. Ragatz, San Marino, Calif., assignor to Union Oil Company of California, Los Angeles, Calif., a corporation of California Original application June 26, 1937, Serial No. 150,657. Divided and this application August 22, 1938, Serial No. 226,105

6 Claims. (Cl. 196—133)

The present invention relates to methods and apparatus for detecting influx of water, and more particularly pertains to a method and apparatus whereby a warning is given whenever excessive quantities of water or other low boiling liquids are present in a relative higher boiling liquid. This case is a true division of a copending application, Serial No. 150,657, filed June 26, 1937. Specifically, the invention is of particular importance in connection with solvent extraction operations, particularly where the solvent employed is of the type of liquid sulfur dioxide. This is due to the fact that liquid sulfur dioxide is not corrosive, while sulfurous acid which results from contact of liquid sulfur dioxide with water is corrosive, particularly when large quantities thereof are present. Obviously, although the presence of small quantities of water in an oil being solvent extracted are not detrimental due to the high degree of dilution of the sulfurous acid formed, the inflow or entrance of larger quantities of water will tend to form considerable quantities of sulfurous acid so that the concentration thereof in the oil being extracted may reach a point to cause considerable damage to the equipment.

Also, in the solvent dewaxing of mineral oil, as is customarily practiced, the oil to be dewaxed is mixed with a solvent, the oil-solvent mix chilled to precipitate the wax, and the precipitated wax separated by filtration, centrifuging, or cold settling from the resultant dewaxed oil. Some of the solvent employed in the process is retained in the separated slack wax, the bulk of the solvent being normally retained in the dewaxed oil. For the purpose of further utilization of the wax, as well as to prevent loss, it is desirable to remove this solvent from the slack wax thus produced. However, if any water is present in the system, it freezes out and is separated along with the slack wax.

In such case, the recovery of solvent from the slack wax is accompanied by great difficulties. Thus, even if the solvent used is not of the type of liquid sulfur dioxide which, as aforesaid, reacts with water to produce a corrosive acid, the presence of any appreciable quantities of water is undesirable, particularly when a solvent is employed which is miscible or soluble in water. In such case, it is extremely difficult to recover the solvent substantially free from water. On the other hand, if the water is not separated from the system it will gradually accumulate and dilute the solvent and this destroys its effectiveness as a dewaxing or solvent extracting agent.

In view of the above, the oils which are treated with solvents, whether for the purpose of separating therefrom the slack wax, or, for example, for treating a mineral oil distillate to produce fractions or components which are, respectively, more and less paraffinic in nature than the original oil treat, are all dehydrated. However, it is impractical to remove all traces of water from such oils. Furthermore, in large plant operations it frequently occurs that a certain portion of the oil under treatment does not receive the necessary degree of treatment, with the result that such oil may contain an unduly large amount of water which, as stated above, may cause damage to the treating plant or destroy the effectiveness of the solvent utilized. It is, therefore, the main object of the present invention to eliminate the above disadvantages and to detect the presence of any appreciable quantities of water in the oil which is to undergo treatment with one or more solvents for the purpose or purposes mentioned above.

It is a further object of this invention to provide a process and apparatus whereby relatively small quantities of water present in an oil to be solvent treated may be continuously and adequately removed from said oil prior to its said solvent treatment, and whereby the presence of any appreciable and/or critical quantities of such water will be immediately detected so that adequate and proper steps may be taken to prevent any and all of the above defects caused by the presence of such water during the solvent extracting or dewaxing operations.

The details of the present invention will become apparent from the hereinafter contained description with particular reference to the annexed drawing, the single figure of which is a diagrammatic view of an apparatus for carrying out a preferred embodiment of the invention. Referring now more particularly to this drawing, the oil to be treated is introduced continuously through line 10 into a tank 12, line 10 being equipped with a valve 13 which is actuated by a float 14 located in tank 12 so that the level of the oil in said tank is constantly maintained at a uniform and predetermined level. Line 10 is further provided with a preheater 16, the heating medium for which enters said heater through line 17 and is withdrawn therefrom through line 18. The purpose of the heater will be described in detail hereinbelow in connection with the operations of the apparatus or plant. Dome 20 on tank 12 is provided with a vapor discharge line 21 which leads to a vacuum pump or compressor 22 having only a definite limited capacity. The discharge end of said pump or compressor may be open to the atmosphere or may be connected by line 23 to any other part of the plant. This phase does not constitute any portion of the present invention, and is therefore not shown.

Tank 12 is further provided with a liquid discharge line 25 which may be equipped with a constant volume pump 26 and a valve 27. The tank is also provided with a vent line 29 terminating in a device 30 which consists of an alarm or a similar mechanism which is responsive to and actuable by changes in pressure in tank 12.

The operations of the above described system are comparatively simple. Assuming that the stock consists of a lubricating oil which is to be treated with a solvent such as a mixture of liquid sulfur dioxide and benzene for the purpose of resolving said oil into two components which are, respectively more or less paraffinic in nature than the original stock to be treated, this oil, conveyed into line 10 from an outside source is first preheated in heater 16 to a temperature of 225° F., and then introduced at said temperature into tank 12, the rate of said inflow being regulated by the float controlled valve 13, and being obviously dependent on the rate of discharge of the oil through line 25. In view of the fact that the oil is heated to the above temperature, any water which may be present in the oil will evaporate, and will separate from the oil in tank 12. The pressure in the vapor space above the liquid level in said tank is maintained at a predetermined vacuum by the action of vacuum pump 22, the gases and vapors being withdrawn by said pump through line 21. However, because, as stated, this pump is only of a limited capacity, said predetermined vacuum in the vapor space in tank 12 will be obtained only when the oil being introduced thereinto contains only a very small or substantially negligible percentage of water. If, however, a slug of water enters line 10 together with the oil to be treated, it will vaporize in heater 16 and will create an excessive pressure in tank 12. In such case, this excessive pressure will be transmitted through line 29 to device 30, thus producing an alarm.

Obviously, many modifications and variations of the invention, as hereinbefore set forth, may be made without departing from the spirit and scope of the invention. Thus, although the specific embodiment refers to an assembly used for the detection of relatively excessive quantities of water in an oil fraction to be solvent treated, it is obvious that the same or similar apparatus may be employed to inform the operator when a relatively high boiling point liquid contains an excessive percentage of a relatively lower boiling point liquid. Also, instead of merely producing an audible or visible alarm, the structure may be adapted to operate automatically so that the system may be closed when the above described undesirable condition occurs. For this purpose, it is but necessary to provide conventional relays which will close pumps 22 and 26 (as well as the means introducing the feed into line 10) as soon as the pressure in the upper part of tank 12 has reached a predetermined maximum.

It is also clear that the temperatures and pressures described above may be varied within a wide range. Thus, although the specific example given hereinabove shows that the liquid is preheated to a temperature of about 225° F., it is obvious that this temperature may be lower or higher so long as the water in the oil is vaporized. Obviously, if the low boiling substance in the liquid has a different boiling point or range from that of water, the degree of heating may be varied accordingly. As to the pressure in the vacuum tank 12, as well as the pressure differential which will actuate alarm 30, these may be regulated at will to obtain the desired results enumerated and described above.

It is therefore to be understood that the invention is not to be limited by any detail or details, except as defined by the following claims.

I claim:

1. In a structure of the class described, a feed pipe, a heater on said pipe, a tank on said pipe, means associated with said tank adapted to remove vapors therefrom at a predetermined limited rate, and a device associated with said tank adapted to produce a warning when the pressure in said tank exceeds a predetermined upper limit.

2. In a structure according to claim 1 wherein the tank is further provided with means adapted to withdraw liquids introduced into said tank through the first mentioned pipe.

3. A structure adapted to detect the presence of excessive quantities of water in an oil passed therethrough which comprises a tank, a pipe leading into said tank, a heater on said pipe adapted to preheat the liquid mixture conveyed thereinto through said pipe, means communicating with said tank adapted to remove the vapors therefrom at a predetermined constant and limited rate, means communicating with said tank adapted to remove continuously the oil from said tank, and a device on said tank adapted to produce a warning when the pressure in said tank exceeds a predetermined upper limit.

4. In a structure according to claim 3 wherein the pipe leading into the tank is provided with means adapted to regulate the rate of flow of the liquid mixture into said tank.

5. A structure adapted to detect the presence of excessive quantities of water in an oil passed therethrough which comprises a tank, a pipe leading into said tank, a heater on said pipe adapted to preheat a liquid mixture conveyed thereinto through said pipe, regulating means on said pipe adapted to maintain a substantially uniform liquid level in said tank, a pipe communicating with substantially the upper portion of said tank, means on said pipe adapted to remove the vapors from said tank and through said pipe at a predetermined constant and limited rate, means communicating with said tank adapted to remove the oil continuously from said tank and a device on said tank adapted to produce a warning when the pressure in said tank exceeds a predetermined upper limit.

6. In a structure according to claim 5 wherein the last mentioned device produces an audible warning when the pressure in the tank exceeds the predetermined upper limit.

EDWARD G. RAGATZ.